United States Patent [19]

Endo

[11] Patent Number: 4,654,839
[45] Date of Patent: Mar. 31, 1987

[54] OPTICAL HEAD

[75] Inventor: Kiyonobu Endo, Yokohama, Japan

[73] Assignee: Canon Kabushiki Kaisha, Tokyo, Japan

[21] Appl. No.: 640,084

[22] Filed: Aug. 10, 1984

[30] Foreign Application Priority Data

Aug. 10, 1983 [JP] Japan .............................. 58-145038
Aug. 10, 1983 [JP] Japan .............................. 58-145039

[51] Int. Cl.$^4$ ............................................ G11B 7/135
[52] U.S. Cl. ...................................... 369/46; 369/13;
369/116; 369/118
[58] Field of Search ................... 250/201 DF; 369/44,
369/45, 46, 112, 116, 117, 118, 120, 13

[56] References Cited

U.S. PATENT DOCUMENTS

| | | | |
|---|---|---|---|
| 3,971,002 | 7/1976 | Bricot et al. ........................... | 369/46 |
| 3,997,715 | 12/1976 | Elliott .................................... | 369/45 |
| 4,357,533 | 11/1982 | Winslow ................................ | 369/45 |
| 4,513,408 | 4/1985 | Nomura et al. ........................ | 369/46 |
| 4,559,622 | 12/1985 | Hazel et al. ............................ | 369/45 |

Primary Examiner—Donald McElheny, Jr.
Attorney, Agent, or Firm—Fitzpatrick, Cella, Harper & Scinto

[57] ABSTRACT

In an optical head for effecting the recording of information onto a recording medium or the reproduction of information from the recording medium, a light beam supplied from a light source unit is directed to the recording medium by a first optical system, the light beam from the recording medium is divided into two light beams by a light divider in a second optical system and the two light beams are directed to photodetectors by the second optical system, and even if the light beam entering the light divider is displaced by tracking, the quantities of light of the two divided light beams are not varied, whereby the influence of the tracking operation on auto focusing is eliminated.

5 Claims, 39 Drawing Figures

PRIOR ART  PRIOR ART  PRIOR ART

FIG. 7A
FIG. 7B
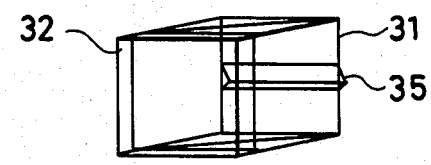
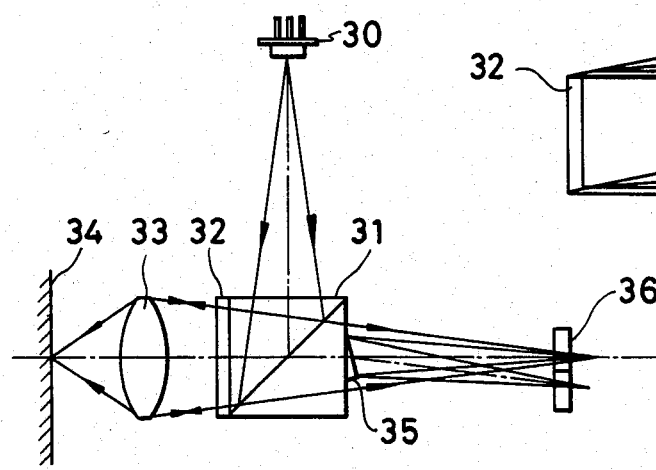
FIG. 7C
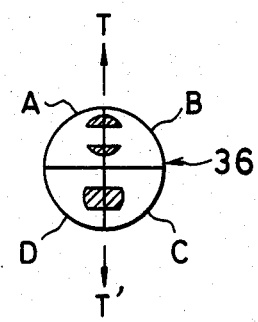

FIG. 11A
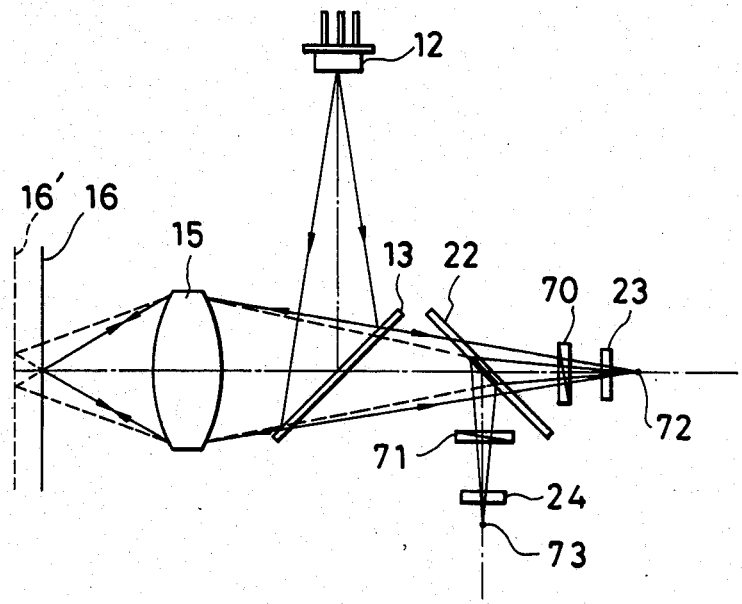
FIG. 11B    FIG. 11C    FIG. 11D
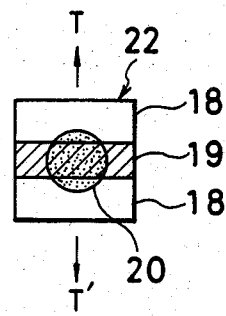 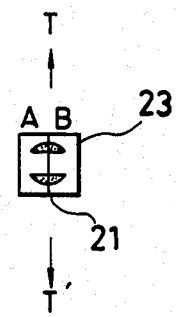 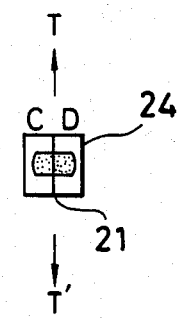

OPTICAL HEAD

BACKGROUND OF THE INVENTION

1. Field of the Invention

This invention relates to the structure of an optical head, and more particularly to the structure of an optical head for an opto-magnetic recording medium in which the reflected light from the recording medium is received by a photodetector such as a photoelectric element and the positional deviation relative to the optical head is detected by a variation in the quantity of light or the shape of the light beam and focusing control (automatic focus control) or tracking control (automatic pursuit control) is effected on the basis of the electrical signal resulting from the detection.

2. Description of the Prior Art

As examples of the recording medium in which a minute light spot is condensed to thereby accomplish recording or reproduction, there are video discs and digital audio discs on which signals such as images or sounds are pre-recorded and magneto-optical recording mediums having a layer of recording material varied by light or the heat energy by light.

The former recording mediums are used only for the reproduction of signals, while the latter recording mediums permits also recording of signals on the part of the user. Also, magneto-optical recording mediums are convenient in that they permit signals to be erased to repetitively record and reproduce signals.

Where signals are recorded or reproduced by causing a minute light spot to be imaged on such a recording medium while moving the recording medium as by rotation or vibration, vertical vibration and lateral displacement due to surface vibration occur to the recording medium and there is caused a relative positional fluctuation between the optical head on which the light spot is imaged and the recording medium. As a result, the size of the spot on the recording medium fluctuates or the applied position of the spot deviates from the signal track and the signals picked up and the pattern recorded become unclear.

To solve this problem, it has been practiced to receive the reflected light from the recording medium by a photoelectric detector, detect the relative positional deviation of the optical head and the recording medium by a variation in the quantity of light or the shape of the light beam and feed back a focus error signal or a tracking error signal to a part of the optical head or of the component of the optical head, and correct the spacing therebetween and the positional deviation such as lateral displacement on the basis of said signal.

An example of the structure of such a conventional optical head will hereinafter be described by reference to FIGS. 1 to 3 of the accompanying drawings.

In FIG. 1, a condensing lens 2 for condensing a light spot on a recording medium 1 is mounted for movement in the direction of the optical axis by drive means 3. Reference numeral 4 designates a pivoting mirror for deflecting the light beam, reference numeral 5 denotes a quarter wavelength plate, reference numeral 6 designates a collimater lens, reference numeral 7 denotes a polarizing beam splitter, reference numeral 8 designates a light source such as a semiconductor laser, reference numeral 9 denotes a cylindrical lens, and reference numeral 10 designates a four-division photodetector.

The light beam emitted from the light source 8 passes through the polarizing beam splitter 7 and is made into a parallel light beam by the collimater lens 6. In this case, the plane of polarization of the light beam emitted from the light source 8 is adjusted so as to be parallel to the plane of the drawing sheet, and the polarizing beam splitter 7 passes therethrough the light beam of such a plane of polarization substantially without any loss. The parallel light beam becomes a circularly or elliptically polarized light beam by passing through the quarter wavelength plate 5 and subsequently is reflected by the pivoting mirror 4 rotatable about its pivot, whereafter it is condensed as a minute spot on the recording medium 1 by the condensing lens 2.

On the other hand, the reflected light beam from the recording medium 1 arrives at the quarter wavelength plate 5 via the condensing lens 2 and the pivoting mirror 4. The light beam passed through this quarter wavelength plate 5 has its plane of polarization orthogonal to that during its incidence and almost all of this light beam is reflected by the polarizing beam splitter 7 and enters the four-division photodetector 10 via the cylindrical lens 9. In this case, the reflected light forms a light beam in the form of astigmatism distribution on the photodetector by an astigmatism producing optical system comprised by the collimater lens 6 and the cylindrical lens 9. Accordingly, the focus state of the spot on the recording medium 1 can be detected from the state of its distribution.

FIGS. 2A, 2B and 2C show the states of distribution of light on the photodetector 10 in various focus states of the spot, FIG. 2A showing the distribution of light in the front focus state, FIG. 2B showing the distribution of light in the in-focus state, and FIG. 2C showing the distribution of light in the rear focus state.

If the respective photoelectric elements of the four-division photodetector 10 are A, B, C and D as shown in FIGS. 2A-2C, the output value of $(A+C)-(B+D)$ can be detected on the basis of the quantity of light received by each element and the front focus state, the in-focus state or the rear focus state can be discriminated by whether the output value is negative, zero or positive. Also, by feeding back this output value to the drive device 3 through an electrical processing system having a suitable gain, correction of the fluctuation of the distance between the condensing lens and the recording medium 1, i.e., automatic focus control (focusing control) can be effected.

The automatic pursuit control (auto tracking) for properly pursuing the signal track of the recording medium is carried out in the following manner.

That is, as shown in FIG. 2D, the four-division photodetector 10 is disposed so that the division line thereof is along the direction T-T' of the track indicated by broken line.

If the minute spot deviates from the signal track under the influence of the eccentricity or the like of the recording medium 1 which is a rotating member, inclination occurs to the distribution of intensity of the light beam as shown in FIG. 2D and accordingly, the track deviation can be detected as a variation in the output value of $(A+D)-(B+C)$ from the quantity of light received by each light-receiving element. The signal indicative of this track deviation, as in the case of the aforementioned automatic focus control, is electrically processed and then fed back to the driving system 3 of the pivoting mirror 4, whereby automatic pursuit control (auto tracking) becomes possible.

In the conventional auto focusing and auto tracking described above, if the focus length of the condensing lens 2 is f, the spot on the recording medium 1 can be laterally moved by 2fθ by rotating the pivoting mirror 4 by θ as shown in FIG. 3A. However, when the reflected light beam arrives at the four-division photodetector 10 through the condensing lens 2, the pivoting mirror 4 and the cylindrical lens 9, the optic axis is deviated by the aforementioned lateral movement of the light spot, and the distribution of light on the photodetector 10 moves from the circle indicated by dot-and-dash line to the circle indicated by broken line, as shown in FIG. 3B.

Then, the variation in the output value of $(A+D)-(B+C)$ is very slight if the distribution of light is in the form of origin-symmetrical distribution and moreover is the movement along the division line, but actually the optical system is one using the cylindrical lens 9 and therefore, neither of the movement and shape of the distribution of light becomes ideal. Accordingly, the movement of the light beam caused by the afore-mentioned tracking operation must be kept to a degree which does not impart influence to the focus signal, and this leads to a problem that the range of tracking control is limited.

That is, in the above-described conventional optical head, when the pivoting mirror 4 is vibrated to effect tracking, there is a disadvantage that the focus signal is also affected and accurate automatic focus control becomes difficult and a disadvantage that alignment of the four-division photodetector 10 and the cylindrical lens 9 must be strictly effected and therefore much time is required of the assembly of the optical head and the cost of manufacture increases.

As a conventional method for eliminating such disadvantages, there has been proposed, for example, the Fouco method (knife edge method) whereby a focus signal is obtained and the photodetector is disposed at a position conjugate with the light source (the position indicated at 11 in FIG. 3A) to solve the problem that the light beam is deviated during the tracking, but in the focus detection by this Fouco method, the light beam is intercepted by the knife edge in the optical path, and this leads to a disadvantage that loss of the quantity of light is involved.

SUMMARY OF THE INVENTION

It is an object of the present invention to eliminate the disadvantages peculiar to the abovedescribed conventional optical head and to provide a novel optical head in which the influence of tracking operation on auto focusing (automatic focus control) can be eliminated and whose cost of manufacture can be reduced by the simplification of the optical system.

In the optical head according to the present invention, a light condensed by a condensing lens is applied to a recording medium, the light beam reflected by or transmitted through the recording medium is divided into a first light beam and a second light beam by a light divider, the first light beam and the second light beam are received by photodetectors, the signals from those photodetectors are processed, whereby an information signal, a focusing signal and a tracking signal can be obtained. The light divider has a first area for directing the light beam entering the divider in a first direction and a second area for directing the light beam entering the divider in a second direction different from said first direction. The shapes and dimensions of these areas are always kept constant. The influence of tracking operation on auto focusing is eliminated by giving the first and second areas such shapes that no variation occurs to the quantities of light travelling in said first direction and said second direction even if the position of the light beam entering the light divider is deviated by tracking.

The invention will become more fully apparent from the following detailed description thereof taken in conjunction with the accompanying drawings.

BRIEF DESCRIPTION OF THE DRAWINGS

FIGS. 7A-7C show another embodiment of the optical head according to the present invention.

FIGS. 11A-11D ahd 12A-12C show still another embodiment of the optical head according to the present invention.

DESCRIPTION OF THE PREFERRED EMBODIMENTS

Figure 4A:
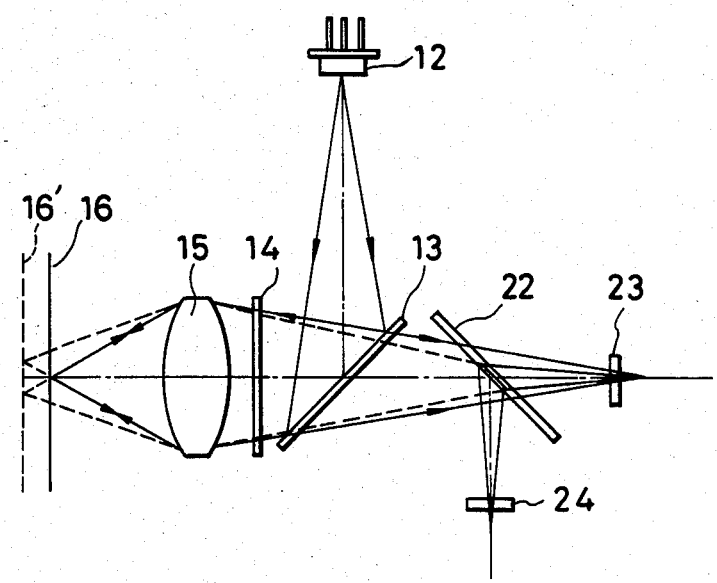
FIGS. 4A-4D illustrate an embodiment of the optical head according to the present invention.

FIG. 4A shows an embodiment of the optical head according to the present invention. A light beam emitted from a light source 12 such as a semiconductor laser is reflected by a polarizing beam splitter 13 and passes through a quarter wavelength plate 14, whereafter it is condensed as a minute spot on the recording medium 16 by a condensing lens 15.

The light beam reflected by the recording medium 16 again passes through the condensing lens 15, the quarter wavelength plate 14 and the polarizing beam splitter 13 and is divided into two light beams by a light divider 22, whereafter the two light beams reach two-division photodetectors 23 and 24.

Figure 1:
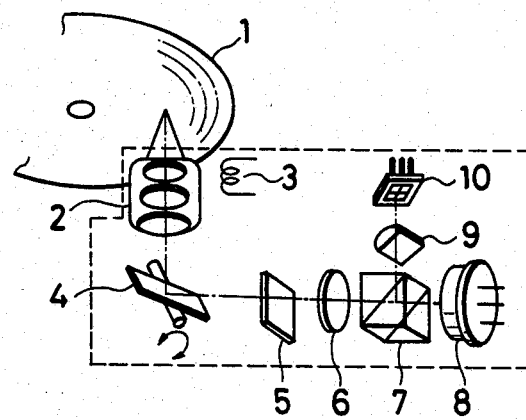
FIG. 1 illustrates the arrangement of the optical system of the conventional optical head.
Figures 2A, 2B, 2C:
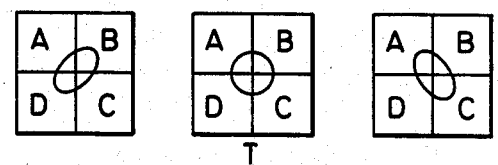
FIGS. 2A-2D illustrate the four-divison photodetector in the conventional optical head and the states of the distribution of light on the light-receiving surface thereof.
Figure 2D:
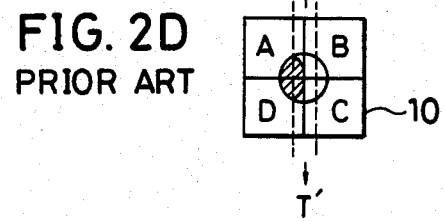
Figure 3A:
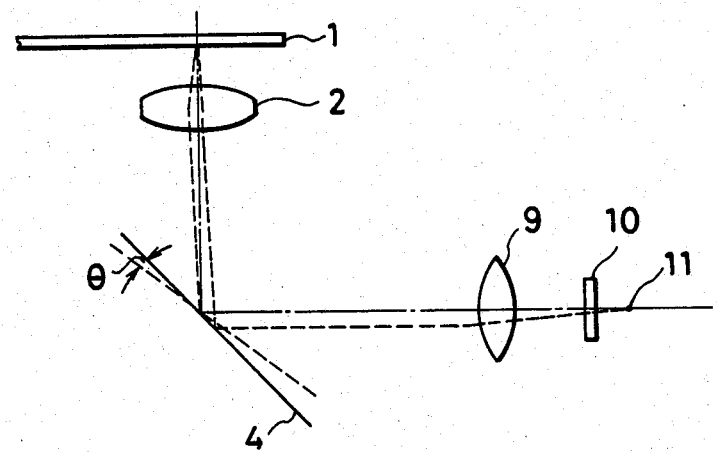
FIGS. 3A and 3B illustrate the state of movement of the light beam by correction of tracking in the conventional optical head.
Figure 3B:
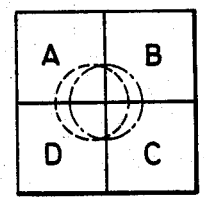

The relation between the plane of polarization of the light beam and the polarizing beam splitter 13 and the quarter wavelength plate 4 is the same as that in the case of the conventional optical head of FIG. 1.

Figure 4B:
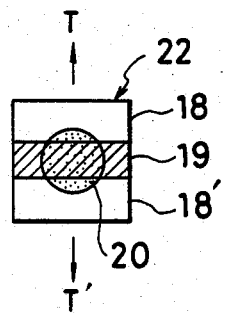

The light divider 22, as shown in FIG. 4B, comprises a light beam reflecting portion 19 and light beam transmitting portions 18, 18'. In FIG. 4B, reference numeral 20 indicates the distribution of the light beam on the light divider 22.

The reflecting portion 19 is not restricted to a total reflection mirror, and the reflecting portion 19 can also be replaced with the transmitting portions 18, 18', and as will be seen from the following description, a similar operational effect can be obtained also by replacing the reflecting portion 19 with the transmitting portions 18, 18'. Further, in FIG. 4B, arrow T—T' indicates the direction of the signal track of the recording medium 16.

Figure 4C:
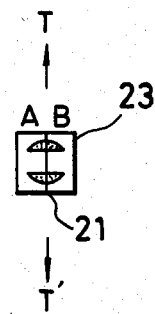
Figure 4D:
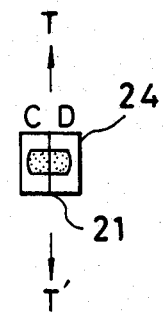

The relations between the distribution of the light beam on the two-division photodetectors 23, 24 and the division line and the direction of the signal track are as shown in FIGS. 4C and 4D.

That is, the distribution of the light on one two-division detector 23 is in the form of a bow-like partial circle vertically divided, as shown in FIG. 4C, because this light has been transmitted through the transmitting portions 18 and 18' of the light divider 22. The division line 21 is disposed so that as shown, the distribution of the light extends over light-receiving elements A and B and moreover, is disposed in a direction coincident with the direction T—T' of the signal track.

The distribution of the light on the other two-division detector 24 is of a cross-sectional capsule shape, as shown in FIG. 4D, because this light is the reflected light from the reflecting portion 19 of light divider 22, and the relation between the division line 21 and the direction T—T' of the signal track is the same as that in the above-described case of FIG. 4C.

When the surface of the recording medium 16 and the condensing lens 15 are in in-focus state, the light beam emitted from the light source 12 reaches the two-division photodetectors 23 and 24 through the recording medium 16 an indicated by solid lines in FIG. 4A.

During such in-focus state, the distribution of the light on the photodetector 22 is as shown in FIG. 4B, and the value of $(A+B)-(C+D)$ is operated on the basis of the electrical signals from the light-receiving elements A, B and C, D of the photodetectors 23 and 24, respectively, and the output data thereof can be rendered into the signal level during the state.

When the recording medium 16 is displaced to a position indicated by reference numeral 16' in FIG. 4A due to the surface vibration or the like, the reflected light beam assumes a state shown by broken line, and the quantity of light to one detector 23 decreases and the quantity of light to the other detector 24 increases. Accordingly, the output value of $(A+B)-(C+D)$ decreases. On the other hand, when the recording medium 16 is displaced in the opposite direction to the position indicated by the reference numeral 16', the output value of $(A+B)-(C+D)$ increases. Thus, a focus error signal is obtained and the focus state can be detected.

Figures 5A, 5B, 5C:
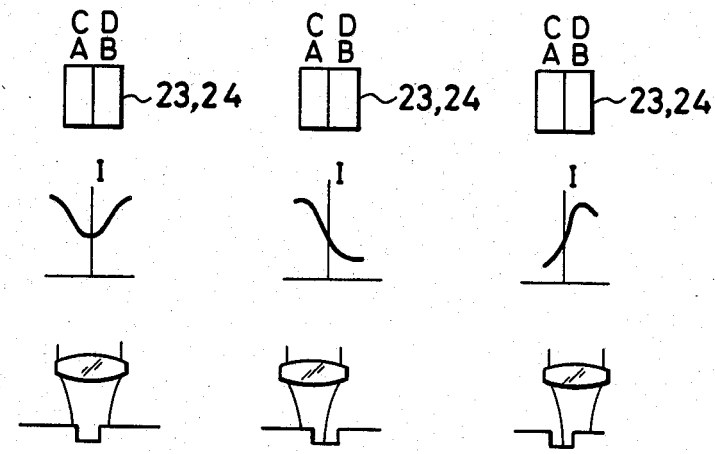
FIGS. 5A-5C show the state of the distribution of light of the tracking deviation in the photodetector shown in FIG. 4.
Figure 6:
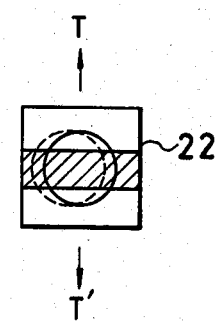
FIG. 6 illustrates the movement of the light beam in the light divider of FIG. 4.

Reference is now made to FIGS. 5 and 6 to describe the operation of detecting a signal for correcting the deviation of the spot from the signal track, i.e., a tracking signal, by the optical head described in connection with FIGS. 4A-4D.

In FIGS. 5A, 5B and 5C, the two-division photodetectors 23 and 24, the distributions of light on these detectors and the relative positional relation between the light spot and the signal track on the recording medium are shown from above.

That is, FIG. 5A shows a case where the spot rests on the signal track, FIG. 5B shows a case where the spot is deviated to the left, and FIG. 5C shows a case where the spot is deviated to the right, and in conformity with the respective cases, there is provided the distribution of intensity of light as shown by the distribution of quantity of light on the detector in the middle stage of FIG. 5.

Accordingly, as is apparent from the state shown in FIG. 5, the output value of $(A+C)-(B+D)$ obtained in conformity with quantities of light received by the light-receiving elements A, B, C and D of the two-division photodetectors 23 and 24 provides a tracking signal and the tracking error can be detected by the variation in this value.

According to the embodiment of the present invention described in connection with FIGS. 4 and 5, the reflecting surface of the light divider 22 is in the form of stripes as shown in FIG. 4B and the direction thereof is perpendicular to the direction of the track and therefore, the following effect is obtained.

That is, where tracking is effected while the condensing lens 15 is moved in a direction orthogonal to the track by the tracking signal, movement of the light beam occurs on the photodetector 22, but even if the light beam moves from the solid line position to the broken line position as shown in FIG. 6, any variation in the quanitities of light divided by the photodetectors 23 and 24 can be prevented by rendering the direction of the stripes forming the reflecting surface 19 (the direction perpendicular to the direction T—T' of the signal track), the direction T—T' of the signal track and the direction of correction of the position of the condensing lens 15 (parallel to the optic axis) into the relationship used in the previously described embodiment.

The movement of the light beam on the photodetectors 23 and 24 does not affect the focus signals as long as the light beam emerges from the light-receiving area.

In FIG. 4B, use has been made of the reflecting surface 19 in the form of a stripe extending in the direction orthogonal to the direction of the track, but the shape of the reflecting surface provided on the light divider 22 may be any shape which will not cause any variation in quantity of light of the light beam divided into two light beams by the light divider even if the position of the beam is moved by tracking.

Thus, according to the above-described embodiment, there is obtained the structure of an optical head in which both automatic focus control (auto focus) and automatic signal track follow-up control (auto tracking) can be carried out accurately and easily.

As regards the aformentioned focus signal, a similar detecting method is described in Japanese Patent Publication No. 43302/1978, and this method detects the in-focus state when the difference between the quantities of light travelling toward the two photodetectors is zero, and detects the focus error in the other case. Accordingly, in the known technique, the quantity of light is divided equally for the two photodetectors, and therefore the area ratio of the reflecting portion and the non-reflecting portion of the light divider is small and accordingly the manufacture of the light divider is difficult. In this known technique, tracking signal detection is not effected and only the detection of the focus signal is disclosed.

FIGS. 7A–7C show a further embodiment of the optical head according to the present invention. In the present embodiment, a polarizing beam splitter 31, a quarter wavelength plate 32 and a light divider (light dividing element) 35 are made integral with one another, and this leads to a very structure because as the compactness of the optical head.

That is, the light beam from a light source 30 is reflected by the polarizing beam splitter 31 and passes through the quarter wavelength plate 32, whereafter it is condensed as a minute spot on a recording medium 34 by a condensing lens 33. The reflected light beam from the recording medium again passes through the condensing lens 33 and the quarter wavelength plate 32 and further through the polarizing beam splitter 31. The light dividing element 35 such as a prism is provided on the exit side end surface of the polarizing beam splitter 31, and part of the light beam changes its direction of travel and the remainder of the light beam travels in the initial direction of travel and both of these light beams enter a photodetector (four-division photodetector) 36 formed unitarily.

The four-division photodetector 36, as shown in FIG. 7C, comprises four light-receiving surfaces (light-receiving elements) A, B, C and D and is divided into four by a vertical line of division along the direction T—T' of the track and a horizontal line of division. The light divider 35 has a transmitting portion and a reflecting portion similar to those in the embodiment of FIG. 4B, and accordingly, the relative positional relation of the distribution (the portion indicated by hatching) of the light beam on the photodetector 36 to each line of division is as shown.

According to the embodiment shown in FIG. 7, there is obtained an effect similar to the effect of the embodiment of FIGS. 4 and 5 and in addition, there is obtained the effect that the optical head can be made very compact because the polarizing beam splitter 31, the quarter wavelength plate 32 and the light divider 35 are made integral with one another as shown in FIG. 7B and the photodetector 36 corresponding to the two two-division photodetectors 23 and 24 in FIG. 4A is unitarily comprised of a four-division photodetector.

Figure 8:
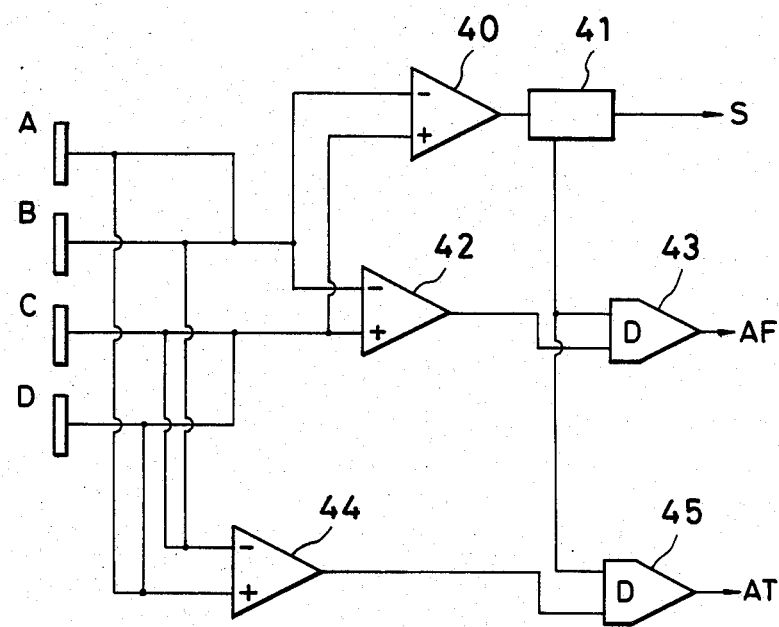
FIG. 8, consisting of A-D, shows an example of the electrical processing system for obtaining various signals by the optical head of the present invention.

Reference is now had to FIG. 8 to describe an example of the electrical processing system for obtaining the information signal, the auto focus signal and the auto tracking signal in each of the above-described embodiments.

In FIG. 8, electrical signals obtained from light-receiving elements A, B, C and D are processed in the following manner, whereby the information signal, the auto focus signal and the auto tracking signal are obtained.

That is, the information signal S is obtained as a high frequency component resulting from amplifying signals (A+B) and (C+D) by an addition amplifier 40 and passing it through a frequency discriminator 41.

The auto focus signal AF is obtained by taking the difference between the signals (A+B) and (C+D) by a differential amplifier 42 and dividing it by a signal of low frequency component passed through the frequency discriminator 41, in a divider 43.

The auto tracking signal AT is obtained as a signal resulting from taking the difference between the signals (A+D) and (B+C) by a differential amplifier 44 and dividing it by a signal of low frequency signal component passed through the frequency discriminator 41, in a divider 45.

In the electrical processing system for obtaining the above-described signals, almost all of the noise component resulting from a fluctuation of the quantity of light of the light source or irregularity of the reflection of the recording medium is contained in the low frequency component passed through the frequency discriminator 41.

Thus, this noise component contained in the auto focus signal AF and the auto tracking signal AT can be removed by dividing it by the low frequency component in the dividers 43 and 45.

As a method for effecting the processing without effecting the divisions in the dividers 43 and 45, it would occur to render the light division into an equal quantity of light in the case of auto focus and to make the distribution of light in FIG. 7C laterally symmetrical with respect to the vertical line of division in the case of auto tracking.

Further, the tracking signal AT can also be obtained only by (A−B) or (D−C).

Description will now be made of a case where an opto-magnetic recording medium such as MnBi, GdTbFe, TbFe, TbDyFe, MnCuBi or GdTbFeCo is used as the recording medium. FIGS. 9 and 10 are illustrations of the recording and reproduction of the opto-magnetic recording medium.

Figure 9A:
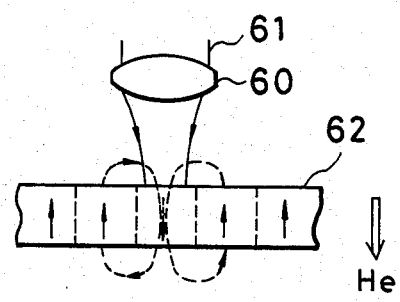
FIGS. 9A-9C, 10A and 10B illustrate the principle of recording and the principle of reproduction of an optomagnetic recording medium.
Figure 9B:
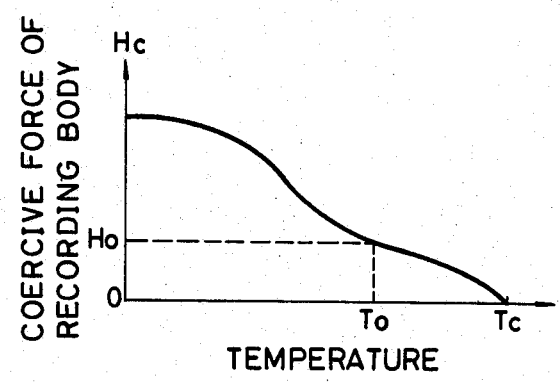

In FIG. 9A, a light beam 61 condensed on a recording body 62 by a condensing lens 60 causes the temperature of a part of the recording body 62 to rise. At this time, the coercive force of the opto-magnetic recording body varies for temperature as shown in FIG. 9B. That is, as is apparent from the graph of FIG. 9B in which the abscissa represents temperature D and the ordinate represents the coercive force of the optomagnetic recording body, the coercive force decreases with the temperature rise of the recording body and the coercive force Hc becomes zero at curie temperature Tc.

Figure 9C:
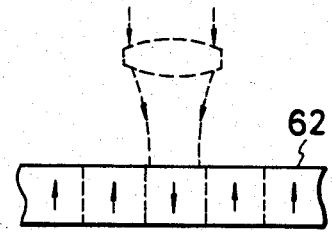

When the temperature of the recording body rises to temperature To and the coercive force becomes Ho, if the intensity of the surrounding magnetic flux loop as shown by broken lines in FIG. 9A or the magnetic field He applied from the outside is greater than the coercive force Ho, the direction of the magnetic field in the magnetic section which initially had an upward magnetic field as shown in FIG. 9C is inverted downwardly. Accordingly, information signals can be recorded on the recording body (recording medium) by the vertical direction of the magnetic field in each magnetic section.

On the other hand, reproduction of written information can be accomplished by the utilization of the magneto-optic effect known as the Kerr effect or the Faraday effect.

The Kerr effect will now be described by reference to FIG. 10A.

Figure 10A:
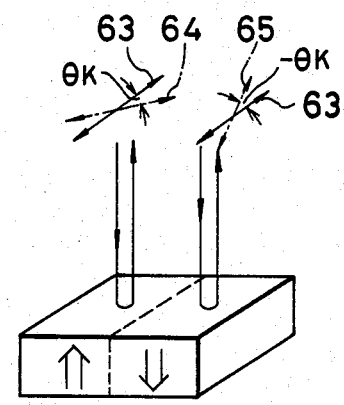

The Kerr effect is a phenomenon which occurs when a light beam is reflected from a magnetic medium, and the plane of polarization 63 during the incidence of the light beam rotates by angles $\theta k$ and $-\theta k$ as indicated by reference numerals 64 and 65 in FIG. 10A. The direction of rotation of this plane of polarization is upward or downward of the magnetic section or in other words, rightward or leftward. Accordingly, by inserting a polarizing plate into the reflected light beam, rotation of the plane of polarization can be taken out as a variation in intensity of light.

Figure 10B:
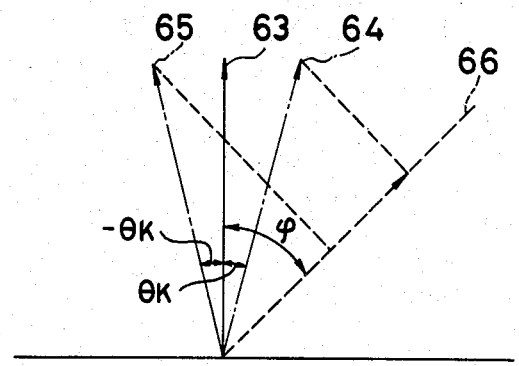

Therefore, if the direction of the transmission axis of the polarizing plate is inclined by an angle $\phi$ from the plane of polarization of the incident light beam as indicated by reference numeral 66 in FIG. 10B, the variation $I_{AC}$ in intensity of light obtained in this case will be given by the following equation (1) and a signal of an intensity proportional to the angle $\theta k$ will be obtained.

$$I_{AC} \alpha \cos^2(\phi - \theta k) - \cos^2(\phi + \theta k) = \sin 2\phi \sin 2\theta k \quad (1)$$

Accordingly, recording of the signal can be accomplished by light-and-dark-modulating the light source in accordance with the signal, and reproduction of the signal can be accomplished by applying a predetermined quantity of light (a quantity of light less than the sensitivity of the recording body) to the recording medium and detecting the reflected light therefrom.

FIG. 11 shows an embodiment of the optical head in which an opto-magnetic recording medium is used as the recording medium. The basic construction of this embodiment is the same as the construction of the optical head shown in FIG. 4. Accordingly, in FIG. 11, members given reference numerals similar to those in FIG. 4 are similar members and such members need not be described herein. The differences of the construction of the optical head shown in FIG. 11 from the construction of the optical head shown in FIG. 4 are that the quarter wavelength plate 14 is unnecessary in the optical head of FIG. 11 and that polarizing plates 70 and 71 are provided between the light divider 22 and the respective two-division photodetectors 23, 24.

Figure 12:
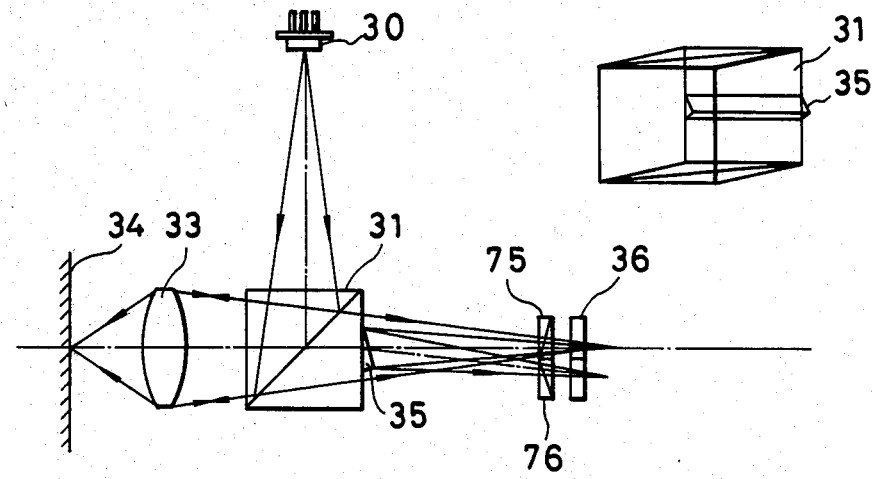
Figure 12:
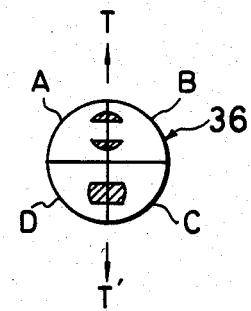

FIG. 12 shows another embodiment of the optical head in which an opto-magnetic recording medium in used as the recording medium. The basic construction of this embodiment is the same as the construction of the optical head shown in FIG. 7. In FIG. 12, members given reference numerals similar to those in FIG. 7 are similar members and such members need not be described herein.

The differences of the construction of the optical head shown in FIG. 12 from the construction of the optical head of FIG. 7 are that the quarter wavelength plate 32 is unnecessary in the optical head of FIG. 12 and that in the optical head of FIG. 12, polarizing plates 75 and 76 are provided forwardly of the four-division photodetector 36.

In the optical heads shown in FIGS. 11 and 12, it is possible to obtain a focusing signal and a tracking signal in a manner similar to the signal processing in the above-described optical head, and the manner in which focusing and tracking of higher accuracy is effected by effectively utilizing the constructions of the optical heads shown in FIGS. 11 and 12 will hereinafter be described by the use of the optical head shown in FIG. 12. In this case, polarizing plates 75 and 76 are disposed so that their transmission axes correspond to the position of an angle $\phi$ and the position of an angle $(90° - \phi)$ shown in FIG. 10B.

The signal obtained when the transmission axis of one polarizing plate 75 is disposed at the angle $\phi$ as previously mentioned is given by the following equation with the bias component also taken into account:

$$I_{75} = I_0[\cos^2\phi + \cos^2(\phi - \theta k) - \cos^2(\phi + \theta k)] \quad (2)$$

$$= I_0[\tfrac{1}{2} + \tfrac{1}{2}\cos 2\phi + \sin 2\phi \sin 2\theta k]$$

Also, the signal obtained when the transmission axis of the other polarizing plate 76 is disposed at the angle $(90° - \phi)$ is given by the following equation (3) with the bias component taken into account:

$$I_{76} = I'_0[\cos^2(90° - \phi) + \cos^2(90° - \phi + \theta k) - \cos^2(90° - \phi - \theta k)] \quad (3)$$

$$= I'_0[\tfrac{1}{2} - \tfrac{1}{2}\cos 2\phi - \sin 2\phi \sin 2\theta k]$$

In the above equations, $I_O$ and $I'_O$ represent the quantities of light after the light beam has been divided.

If the gains when signals are obtained by photoelectrically converting these quantities of light are G and G', electrical signals $V_{75}$ and $V_{76}$ obtained for said quantities of light are given by the following equations (4) and (5):

$$V_{75} = I_{75} \cdot G = I_O G \cdot [\tfrac{1}{2} + \tfrac{1}{2}\cos 2\phi + \sin 2\phi \sin 2\theta k] \quad (4)$$

$$V_{76} = I_{76} \cdot G' = I'_O G'[\tfrac{1}{2} - \tfrac{1}{2}\cos 2\phi - \sin 2\phi \sin 2\theta k] \quad (5)$$

Figure 13A:
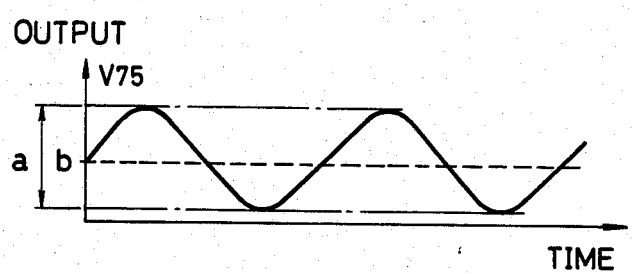
FIGS. 13A-13C show a form of the signal obtained by the optical head shown in FIG. 12.
Figure 13B:
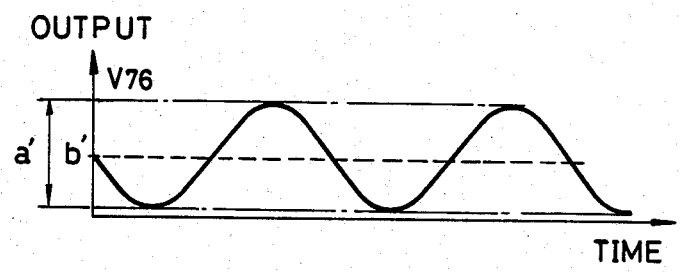

If $\theta k$ is considered as a function of time, the outputs of the electrical signals $V_{75}$ and $V_{76}$ given by these equations (4) and (5) are graphically shown in FIGS. 13A and 13B. In these graphs, the abscissa represents time and the ordinate represents the voltage values of the electrical signals $V_{75}$ and $V_{76}$.

In FIG. 13A, amplitude a is equal to $I_O G \sin 2\phi \sin 2\theta k$ and bias component b is $I_O G[\tfrac{1}{2} + \tfrac{1}{2}\cos 2\phi]$. Also, in FIG. 13B, amplitude a' is $I'_O G' \sin 2\phi \sin 2\theta k$ and bias component b' is $I'_O G'[\tfrac{1}{2} + \tfrac{1}{2}\cos 2\phi]$.

It should be noted here that in equations (4) and (5), the positive and negative of the signal amplitude are reversed. The difference V between these signals may be obtained by the following equation (6):

$$V = V_{75} - V_{76} = \tfrac{1}{2}[I_O G - I'_O G'] + \tfrac{1}{2}\cos 2\phi [I_O G + I'_O G'] + [I_O G + I'_O G'] \sin 2\phi \sin 2\theta k \quad (6)$$

When $I_O G = I'_O G'$ and $\phi = 45°$, the difference V between these signals is as follows:

$$V = 2 I_O G \sin 2\theta k \quad (7)$$

Figure 13C:
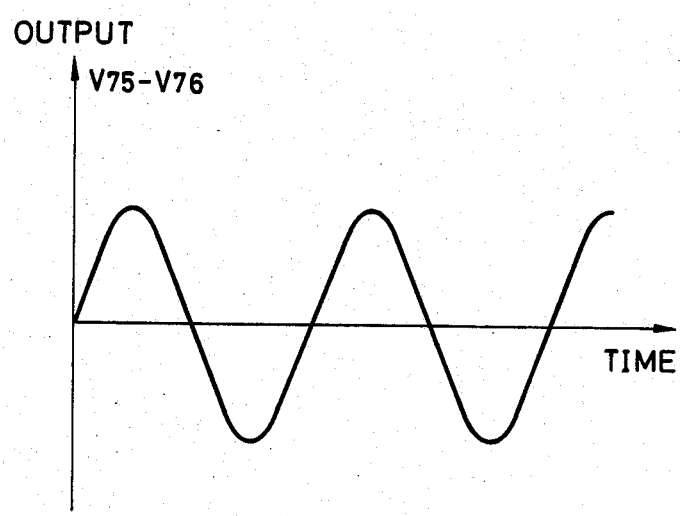

According to the difference V between the signals given by equation (7), there is no bias component and moreover, only a signal component in which the signal amplitude is twice as compared with equation (4) or (5) is obtained, and this state is graphically shown in FIG. 13C.

By thus eliminating the bias component, the influence imparted to the electrical signal by a noise component which is not concerned in polarization such as irregularity of the reflection factor of the recording body and fluctuation of the quantity of light of the light source can be eliminated and accordingly, signal reproduction excellent in S/N can be accomplished.

Figure 14:
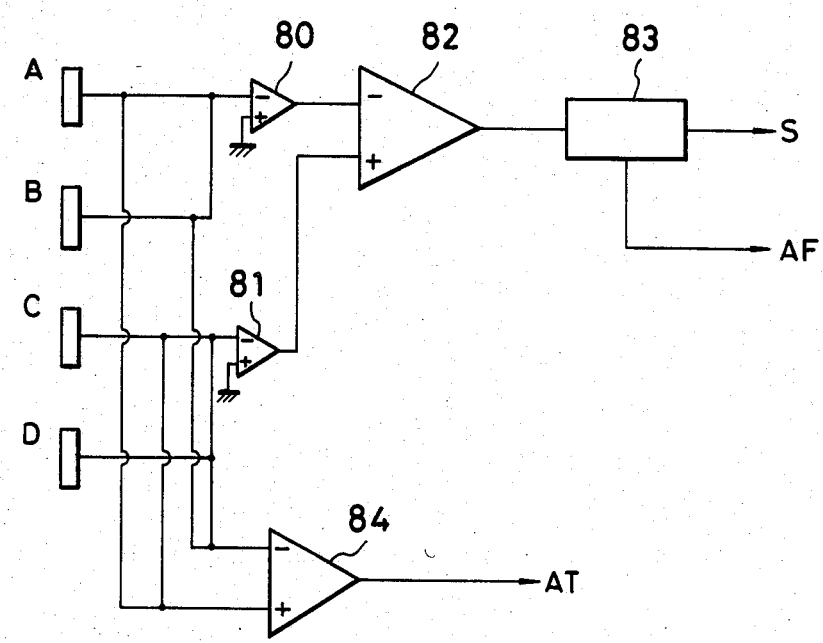
FIG. 14, consisting of A-D, shows an example of the electrical processing system for obtaining various signals by the optical head of the present invention.

Reference is now had to FIG. 14 to describe an example of the electrical processing system for obtaining an information signal S, an auto focus signal AF and an auto tracking signal AT on the basis of such information signal processing. That the electrical signal obtained from light-receiving elements A, B, C and D are processed in the following manner.

To obtain the information signal S, a signal A+B is amplified at a suitable gain by an amplifier 80 and a signal C+D is amplified at a suitable gain by an amplifier 81, and these signals are input to a differential amplifier 82 and the difference therebetween is taken, whereafter the signal component zone is taken out by a frequency discriminator 83, whereby the information signal S is obtained.

To obtain the auto focus signal AF, the difference obtained by the differential amplifier 82 is directed to the frequency component discriminator 83 and a low frequency component is taken out by the frequency component discriminator, whereby the auto focus signal AF is obtained. When the surface accuracy and surface vibration of the recording body are taken into consideration, this auto focus signal AF is obtained by taking out a frequency component usually of 2KHz or less.

To obtain the auto tracking signal AT, when a signal pattern is imaged on the light-receiving surface of the photodetector, the distribution of light on the surfaces of the light-receiving elements A, B and the light-receiving elements C, D are light-and-dark-reversed and therefore, the difference between signals (A+C) and (B+D) is taken by the differential amplifier 84, whereby the auto tracking signal is obtained. The construction for imaging the signal pattern on the light-receiving surface of the photodetector is adopted in a case where the light beam entering the surface of the recording medium does not create a diffraction phenomenon, that is, in a case where an opto-magnetic recording medium is provided on a track having no grooves. In a case where the light beam entering the surface of the recording medium does not create a diffraction phenomenon, the tracking signal cannot be obtained at the position of the far field whereat the photodetectors 23 and 24 are spaced apart from the imaged points 72 and 73 of the light beam, as shown in FIG. 11, for example. In such a case, the photodetectors 23 and 24 may be disposed at the imaged points 72 and 73 of the light beam to detect any variation in distribution of intensity of light, whereby the tracking signal can be obtained.

Where grooves are provided on the recording body in advance and recording and reproduction are effected along these grooves, diffracted light is created even if an opto-magnetic recording medium is used and therefore, as described above, the output value of (A+C)−(B+D) is detected and the tracking signal can be obtained.

The integral structure of the polarizing beam splitter 31 and the light divider 35 shown in FIGS. 7 and 12 can be realized by any one of various structures as shown in FIGS. 15A–15D.

Figure 15A:
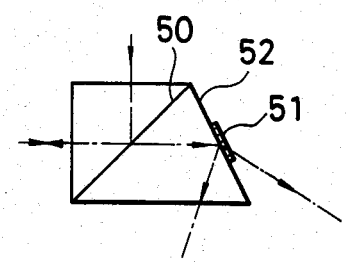
FIGS. 15A-15D illustrate various structures of light dividing means applied to the optical head of the present invention.

That is, in the case of FIG. 15A, a reflecting mirror 51 is provided on a portion of one surface 52 of the polarizing beam splitter 50 and light division is effected by this reflecting mirror 51.

Figure 15B:
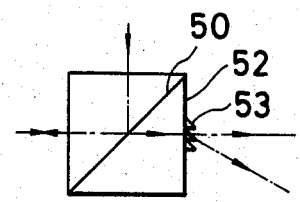

FIG. 15B shows a case where a brazed diffraction grating 53 is provided on one surface 52 of the polarizing beam splitter 50 and light division is effected by utilization of the diffracting action.

Figure 15C:
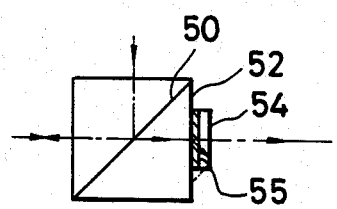

FIG. 15C shows a case where a holographic dividing element 54 is provided on one surface 52 of the polarizing beam splitter 50 and light division is effected thereby. In this case, a diffraction grating 55 of fine pitch is provided on the end surface of the light divider 54 to secure the diffraction angle of the diffracted light sufficiently greatly, whereby total reflection may be caused on the boundary surface between the divider 54 and the air and the diffracted light may be caused to emerge from the end surface of the divider.

Figure 15D:
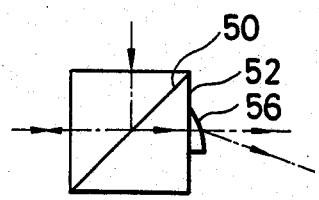

FIG. 15D shows a case where an element 56 having the condensing function such as a half lens or a half Fresnel lens is provided on one surface 52 of the polarizing beam splitter 50 and light division is effected by this element.

Substantially the same operational effects as that of the embodiments shown in FIGS. 7 and 12 can be achieved also by adopting any of the structures shown in FIGS. 15A–15D.

In the optical system according to the embodiment of the present invention shown in FIG. 7A, a structure in which a collimater lens is provided between the light source 30 and the polarizing beam splitter 31 to collimate the divergent light from the light source 30 and a condensing lens is provided between the polarizing beam splitter 31 and the photodetector 36, or a structure in which a collimater lens is provided between the quarter wavelength plate 32 and the condensing lens 33 can be adopted and an effect similar to that of the embodiment of FIG. 7 can be achieved also with these structures.

Also, in the arrangement of the embodiment shown in FIG. 12, a construction in which a collimater lens is provided between the light source 30 and the polarizing beam splitter 31 to collimate the divergent light from the light source 30 and a condensing lens is provided between the polarizing beam splitter 31 and the photodetector 36 can be adopted or a construction in which a collimater lens is provided between the polarizing beam splitter 31 and the condensing lens 33 can be adopted, and an effect similar to that of the embodiment shown in FIG. 12 can be achieved also by adopting these constructions.

According to the present invention, as described above, there is provided an optical head of very simple structure which can easily and accurately accomplish both auto focusing and auto tracking.

In addition, as compared with the conventional optical head, it is not necessary to adopt the zero method (the method of setting the state in which the difference in quantity of light is zero to the target value of a servo) in the servo (automatic control) system, and the cylindrical lens can be omitted and therefore, the positional accuracy and dimensional accuracy of each element can be lessened and the cost of manufacture can be reduced.

Also, in each of the above-described embodiments, the reflecting portion and the non-reflecting portion of the light dividing element are in the form of stripes as shown, for example, in FIG. 4B and the direction T−T' of the signal track is set to a direction orthogonal to the stripes and therefore, the influence of the tracking operation on the focus signal can be eliminated, whereby control of auto focusing and auto tracking can be carried out easily and reliably.

Further, according to the embodiments shown in FIGS. 7, 12 and 15, a light dividing element is provided integrally on the end surface of the polarizing beam splitter and therefore, as compared with a case where an independent light divider is used, the space required can be reduced, whereby compactness of the optical head can be achieved.

As is apparent from the foregoing description, according to the present invention, the influence of the tracking operation on the focus signal can be eliminated, whereby control of auto focusing and auto tracking can be accomplished easily and accurately and further, the positional accuracy and dimensional accuracy of each element need not be so high as in the case of the conventional optical head, whereby there can be realized an optical head which can be manufactured at a low cost.

I claim:

1. An optical head for effecting the recording of information onto a recording medium or the reproduction of information from the recording medium, said recording medium having one or more signal tracks for storing information, comprising:
   a light source unit for supplying a light beam;
   a first optical system for directing the light beam from said light source unit to the recording medium;
   photodetector means; and
   a second optical system for directing the light beam from the recording medium to said photodetector means, said second optical system having a light beam divider for dividing the light beam from the recording medium into a first light beam and a second light beam, said light beam divider having a stripe-shaped light beam separating portion extending in a direction orthogonal to a direction correspoinding to the direction of a signal track on the recording medium.

2. An optical head according to claim 1, wherein said light divider has a stripe-shaped light beam separating portion extending in a direction orthogonal to the direction of a track.

3. An optical head for effecting the recording of information onto a recording medium or the reproduction of information from the recording medium, said recording medium having one or more signal tracks for storing information, comprising:
   a light source unit for supplying a light beam;
   a first optical system for directing the light beam from said light source unit to the recording medium;
   first and second photodetectors for receiving the light beam from said recording medium;
   a second optical system for directing the light beam from said recording medium to said first and second photodetectors, said second optical system having a light beam separating means for separating the light beam from the recording medium into two light beams, said light beam separating means having a first area for directing the incident light beam to said first photodetector and a second area for directing the incident light beam to said second photodetector; and
   signal processing means for processing the signals from said first photodetector and said second photodetector and generating a tracking signal and a focusing signal, said processing means controlling a focus state of the light beam on the recording medium by the focusing signal representative of the difference between the signals from said first and second photodetectors and controlling a tracking state of the light beam on the recording medium by the tracking signal resulting from detecting any variation in the distribution of light on said photodetectors in a direction orthogonal to a direction corresponding to the direction of a signal track on the recording medium.

4. An optical head according to claim 3, wherein said first and second photodetectors are two-division photodetectors and the division lines thereof are disposed so as to be coincident with the direction corresponding to the of the signal track.

5. An optical head for effecting the recording of information onto an opto-magnetic recording medium or the reproduction of information from the opto-magnetic recording medium, said recording medium having one or more signal tracks for storing information, comprising:
   a light source unit for supplying a light beam;
   a first optical system for directing the light beam from said light source unit to the opto-magnetic recording medium;
   first and second photodetectors for receiving the light beam from the opto-magnetic recording medium;
   a second optical system for directing the light beam from the opto-magnetic recording medium to said first and second photodetectors, said second optical system having light beam separating means for separating the light beam for the opto-magnetic recording medium into two light beams, said separating means having a first area for directing the incident light beam to said first photodetector and a second area for directing the incident light beam to said second photodetector;
   polarizing plates provided forwardly of said first photodetector and said second photodetector, respectively; and
   signal processing means for generating a focusing signal and a tracking signal on the basis of electrical signals obtained by said first and second photodetectors, said processing means including a frequency discriminator and passing the focusing signal representative of the difference between the signals from said first and second photodetectors to the frequency discriminator and effecting the control of a tracking state of the light beam on the opto-magnetic recording medium by the tracking signal resulting from detecting any variation in a distribution of light on said photodetectors in a direction orthogonal to a direction corresponding to the direction of a signal track on the opto-magnetic recording medium.

* * * * *